(12) United States Patent
Weinstein et al.

(10) Patent No.: US 10,735,449 B2
(45) Date of Patent: Aug. 4, 2020

(54) METHODS AND APPARATUSES FOR IMPROVED MOBILE APP SECURITY TESTING VIA BRIDGED NATIVE AND WEB USER INTERFACE INTERACTION

(71) Applicant: viaFORENSICS, LLC, Oak Park, IL (US)

(72) Inventors: David Weinstein, Oak Park, IL (US); Ole André Vadla Ravnås, Oak Park, IL (US); Erik Kristensen, Oak Park, IL (US)

(73) Assignee: VIAFORENSICS, LLC, Oak Park, IL (US)

( * ) Notice: Subject to any disclaimer, the term of this patent is extended or adjusted under 35 U.S.C. 154(b) by 157 days.

(21) Appl. No.: 15/646,741

(22) Filed: Jul. 11, 2017

(65) Prior Publication Data
US 2019/0020673 A1    Jan. 17, 2019

(51) Int. Cl.
*H04L 29/06*   (2006.01)
*G06F 16/951*   (2019.01)
*H04L 29/08*   (2006.01)
*H04W 12/00*   (2009.01)
*G06F 3/0481*   (2013.01)

(52) U.S. Cl.
CPC ........ *H04L 63/1433* (2013.01); *G06F 16/951* (2019.01); *H04L 67/02* (2013.01); *H04L 67/125* (2013.01); *H04L 67/14* (2013.01); *H04L 67/22* (2013.01); *H04W 12/0027* (2019.01); *G06F 3/0481* (2013.01)

(58) Field of Classification Search
CPC ............... H04L 63/1433; G06F 3/0481; G06F 17/30864

USPC ......................................................... 726/25
See application file for complete search history.

(56) References Cited

U.S. PATENT DOCUMENTS

| | | | |
|---|---|---|---|
| 6,266,681 B1 * | 7/2001 | Guthrie | G06F 9/44526 715/234 |
| 6,463,437 B1 * | 10/2002 | Mongilio | G06Q 30/02 |
| 8,239,840 B1 * | 8/2012 | Czymontek | G06F 8/34 717/125 |

(Continued)

FOREIGN PATENT DOCUMENTS

| | | |
|---|---|---|
| CN | 104808971 A | 7/2015 |
| EP | 2 889 770 A1 | 7/2015 |

(Continued)

*Primary Examiner* — Saleh Najjar
*Assistant Examiner* — Peiliang Pan
(74) *Attorney, Agent, or Firm* — Alston & Bird LLP

(57) ABSTRACT

Methods and apparatuses disclosed herein for improved mobile app security testing via bridged native and web user interface interaction. In one example embodiment, a method is provided comprising receiving, by a security instrumentation system, an app for analysis, and discovering, by the security instrumentation system, one or more user interface elements provided by the app. Thereafter, interrogating, by the security instrumentation system, the one or more user interface elements provided by the app and serializing, by the security instrumentation system, the one or more user interface elements. In some embodiments, after serializing the one or more user interface elements, causing presentation of the serialized one or more interface elements via a web browser.

17 Claims, 5 Drawing Sheets

(56) References Cited

U.S. PATENT DOCUMENTS

| | | | |
|---|---|---|---|
| 8,352,903 B1* | 1/2013 | Friedman | G06F 8/30 717/100 |
| 8,392,498 B2 | 3/2013 | Berg et al. | |
| 8,583,777 B1 | 11/2013 | Boyle et al. | |
| 8,754,905 B2 | 6/2014 | Mahajan et al. | |
| 8,782,132 B2 | 7/2014 | Bayliss et al. | |
| 8,843,847 B1* | 9/2014 | Boyle | G06F 9/451 715/781 |
| 8,903,897 B2 | 12/2014 | Relan et al. | |
| 8,918,712 B2 | 12/2014 | Nario et al. | |
| 8,997,081 B1* | 3/2015 | Manion | G06F 8/65 717/168 |
| 9,083,770 B1 | 7/2015 | Drose et al. | |
| 9,092,289 B2 | 7/2015 | Bouthillier et al. | |
| 9,130,932 B2 | 9/2015 | Ding et al. | |
| 9,141,591 B2 | 9/2015 | Pereymer | |
| 9,189,378 B1* | 11/2015 | Ryan | G06F 11/3664 |
| 9,213,684 B2 | 12/2015 | Lai et al. | |
| 9,294,554 B2 | 3/2016 | Mandel et al. | |
| 9,294,719 B2 | 3/2016 | Uhma et al. | |
| 9,307,342 B2 | 4/2016 | Sojoodi et al. | |
| 9,348,555 B2 | 5/2016 | Scholz et al. | |
| 9,406,103 B1 | 8/2016 | Gray et al. | |
| 9,411,782 B2 | 8/2016 | Harris et al. | |
| 9,448,776 B1 | 9/2016 | Sankaran et al. | |
| 9,451,043 B2 | 9/2016 | Zhao et al. | |
| 9,454,363 B1* | 9/2016 | Angell | G06F 8/65 |
| 9,460,230 B1 | 10/2016 | Stepanov et al. | |
| 9,645,910 B1* | 5/2017 | Kaila | G06F 11/3624 |
| 9,652,364 B1* | 5/2017 | Kaila | G06F 11/366 |
| 9,727,651 B1* | 8/2017 | Frazin | H04L 67/02 |
| 10,083,015 B2* | 9/2018 | Yan | G06F 8/38 |
| 10,140,102 B2* | 11/2018 | Cragun | G06F 8/38 |
| 2005/0203389 A1* | 9/2005 | Williams | A61B 6/463 600/431 |
| 2007/0260702 A1 | 11/2007 | Richardson et al. | |
| 2008/0147671 A1 | 6/2008 | Simon et al. | |
| 2009/0249300 A1* | 10/2009 | Vainer | G06F 11/3466 717/127 |
| 2010/0281475 A1 | 11/2010 | Jain et al. | |
| 2011/0167403 A1 | 7/2011 | French et al. | |
| 2011/0320879 A1* | 12/2011 | Singh | H04W 24/06 714/38.1 |
| 2012/0117534 A1 | 5/2012 | Hershenson et al. | |
| 2012/0180073 A1 | 7/2012 | Hung | |
| 2012/0198279 A1* | 8/2012 | Schroeder | G06F 11/2294 714/32 |
| 2012/0260158 A1 | 10/2012 | Steelberg | |
| 2012/0323704 A1 | 12/2012 | Steelberg et al. | |
| 2013/0036196 A1 | 2/2013 | Chan et al. | |
| 2013/0159892 A1 | 6/2013 | Suraj et al. | |
| 2013/0186956 A1* | 7/2013 | Ashok | H04L 41/082 235/385 |
| 2014/0040070 A1 | 2/2014 | Pereymer | |
| 2014/0181629 A1* | 6/2014 | Hey | G06F 11/3672 715/230 |
| 2014/0258970 A1* | 9/2014 | Brown | G06F 8/47 717/103 |
| 2014/0280517 A1 | 9/2014 | White et al. | |
| 2014/0281863 A1 | 9/2014 | Burckart et al. | |
| 2014/0282119 A1 | 9/2014 | Wouhaybi et al. | |
| 2014/0359578 A1* | 12/2014 | Jesse | G06F 8/61 717/124 |
| 2015/0011311 A1 | 1/2015 | Relan et al. | |
| 2015/0012838 A1 | 1/2015 | Hegstad et al. | |
| 2015/0067527 A1 | 3/2015 | Gardner et al. | |
| 2015/0082239 A1 | 3/2015 | Zhao et al. | |
| 2015/0095717 A1* | 4/2015 | Frenz | G06F 11/323 714/46 |
| 2015/0161031 A1* | 6/2015 | Chea | G06F 11/3664 717/125 |
| 2015/0208258 A1* | 7/2015 | Brenzel | H04M 1/24 455/418 |
| 2015/0220492 A1 | 8/2015 | Simeonov et al. | |
| 2015/0269369 A1* | 9/2015 | Hamid | G06F 21/31 726/5 |
| 2015/0281333 A1 | 10/2015 | Albert et al. | |
| 2015/0281869 A1 | 10/2015 | Ramachandran et al. | |
| 2016/0021207 A1 | 1/2016 | Dingwall et al. | |
| 2016/0117159 A1* | 4/2016 | Balko | G11B 27/031 717/178 |
| 2016/0147644 A1* | 5/2016 | Sisinni | G06F 11/368 717/131 |
| 2016/0234624 A1* | 8/2016 | Riva | H04M 1/72522 |
| 2016/0323690 A1 | 11/2016 | Daoud et al. | |
| 2016/0373427 A1 | 12/2016 | Yefimov et al. | |
| 2017/0048319 A1* | 2/2017 | Straub | H04L 67/2847 |
| 2017/0083222 A1 | 3/2017 | Boodhoo | G06F 40/14 |
| 2017/0118134 A1* | 4/2017 | Boodhoo | G06F 16/957 |
| 2017/0192873 A1* | 7/2017 | Ozdemir | G06F 8/71 |
| 2017/0279945 A1* | 9/2017 | Parsons | A47B 87/00 |
| 2018/0089437 A1* | 3/2018 | Baset | G06F 21/577 |
| 2018/0212956 A1* | 7/2018 | Sanganabhatla | H04L 63/0838 |
| 2018/0287926 A1* | 10/2018 | Williams | H04L 41/0813 |

FOREIGN PATENT DOCUMENTS

| | | |
|---|---|---|
| GB | 2518936 A | 4/2015 |
| WO | WO 2014/170714 A1 | 10/2014 |
| WO | WO 2015/162550 A1 | 10/2015 |
| WO | WO 2016/061359 A1 | 4/2016 |

* cited by examiner ing like "press at pixel 200, 1400 and release at pixel 360, 1400." But because pixel-based testing focuses on the exact location of an object on the screen, if an object's appearance or location within a display changes based on screen resolution, display orientation, or the like, some tests may fail. Accordingly, although manual testing by a human is time consuming, the human user has historically been better able to navigate a UI, because of course, mobile apps are typically designed for human interaction, and humans can more effectively adjust to changes in resolution, display orientation, or the like caused by porting the display of a mobile app UI from a mobile computing device to a rig. However, manual testing can introduce inconsistency, delays, and errors into the mobile app security testing process.

METHODS AND APPARATUSES FOR IMPROVED MOBILE APP SECURITY TESTING VIA BRIDGED NATIVE AND WEB USER INTERFACE INTERACTION

TECHNOLOGICAL FIELD

Example embodiments of the present invention relate generally to mobile app security testing and, more particularly, to methods and apparatuses that allow for dynamic analysis and increased security assessment coverage via bridged native and web-based user interface interaction.

BACKGROUND

Mobile computing devices including smart phones and tablet computers serve many functions in business, government, and personal computing. The essential aspects of mobile computing devices as we understand them today include a highly portable form factor enabling ease of use in many settings, usually with a touch screen interface and often combining telephone features; a combination of sensors and networking to enable many useful functions; and the ability to use dedicated "apps" (i.e., computer application software programs designed for mobile computing devices) that leverage the sensors and user interface to perform specific useful functions for the device user.

For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another and with particular hardware and software components of mobile computing devices. For example, the mobile operating systems named above each provide frameworks enabling apps to interact with location services circuitry, wired and wireless network interfaces, user contacts, and other services. Communication with hardware and software modules executing outside of the app is typically provided via application programming interfaces (APIs) provided by the mobile computing device operating system.

One consequence of the proliferation and increased capabilities of mobile computing devices is that it has become possible for apps to gather and transmit extensive data, on various networks, regarding the user of the mobile computing devices. This data can include very sensitive information, such as the user's location, photos, communications, personal identification numbers, passwords, and both financial and health information. The nature of the information accessible by mobile computing devices illustrates the growing need to enhance the security of the various apps installed on a given mobile computing device, which requires mobile app security testing.

The inventors have discovered latent and unmet needs stemming from the nature of existing mobile app security testing methods. User interface (UI) testing may be performed manually by a human tester, or it can be performed automatically with the use of software. Either way, it is typical to utilize a testing device (or "rig") that connects to a mobile computing device that hosts the mobile app. Testing may involve recording, by the rig, a user's interaction with the mobile app. Historically, this involves pixel-based interactions, because the tester interacts on the rig with a ported display of the UI of the mobile app. For example, a user pressing a submit button on a login screen of the mobile app may be recorded based on x, y pixel coordinates, and the record of the interaction may be some-

SUMMARY

Developers, vendors, and users of apps have a strong interest in analyzing and assessing the nature and security of data being handled, stored, and transmitted by mobile computing devices, and in particular by apps running on such devices. Example embodiments described herein provide powerful new capabilities in this area. In particular, these embodiments offer an innovative and comprehensive way of testing apps for vulnerabilities and flaws that could compromise app integrity and/or its users' data, and to enable detection of malicious or suspicious app behaviors. To do so, example embodiments provide for mobile app security testing via bridged native and web-based user interface interaction that avoids problems, such as those caused by pixel-based testing.

In a first example embodiment, a method is provided for improved app security testing using a security instrumentation system. The method includes receiving, by the security instrumentation system, an app for analysis and discovering, by the security instrumentation system, one or more user interface elements provided by the app. The method further includes interrogating, by the security instrumentation system, the one or more user interface elements provided by the app, serializing, by the security instrumentation system, the one or more interface elements, and causing presentation of the serialized one or more interface elements via a web browser.

In some embodiments, discovering the one or more user interface elements provided by the app comprises: traversing an object hierarchy of the app to discover a set of potential user interface elements, querying whether each potential user interface element in the set of potential user interface elements supports an event or exhibits a behavior, and enumerating, based on the query, a subset of potential user interface elements that support an event or exhibit a behavior, wherein the subset comprises the one or more user interface elements.

In some embodiments, interrogating the one or more user interface elements provided by the app comprises accessing one or more text values of the one or more user interface elements.

In some embodiments, serializing the one or more user interface elements further comprises provisioning the one or more user interface elements and generating, using the provisioned one or more user interface elements, web elements that can be rendered in the web browser.

The method further includes recording, by the security instrumentation system, an interaction with the one or more user interface elements via the web browser, causing injection of the interaction with the one or more user interface elements into an executing session of the app, receiving an indication of an occurrence of an event or behavior that initiates an operation from the app, and relaying the event or behavior to an interactivity mediator service, the interactivity mediator service is a rendezvous point for handling one or more sessions associated with the web browser. The one or more sessions associated with the web browser remain active when the web browser is disconnected. In some embodiments, the one or more sessions associated with the web browser provide a real-time display of the interaction with the one or more user interface elements on the app alongside the presentation of the serialized user interface elements via the web browser.

In a second example embodiment, an apparatus is provided for improved app security testing. The apparatus includes at least one processor and at least one memory including computer program instructions, the at least one memory and the computer program instructions configured to, with the at least one processor, cause the apparatus at least to receive, by a security instrumentation system, an app for analysis and discovering, by the security instrumentation system, one or more user interface elements provided by the app. In some embodiments, the computer program instructions, when executed by the at least one processor, further cause the apparatus to interrogate, by the security instrumentation system, the one or more user interface elements provided by the app, serialize, by the security instrumentation system, the one or more interface elements, and cause presentation of the serialized one or more interface elements via a web browser.

In some embodiments, the computer program instructions, when executed by the at least one processor, further cause the apparatus to discover the one or more user interface elements provided by the app comprises: traversing an object hierarchy of the app to discover a set of potential user interface elements, querying whether each potential user interface element in the set of potential user interface elements supports an event or exhibits a behavior, and enumerating, based on the query, a subset of potential user interface elements that support an event or exhibit a behavior, wherein the subset comprises the one or more user interface elements.

In some embodiments, the computer program instructions, when executed by the at least one processor, further cause the apparatus to interrogate the one or more user interface elements provided by the app comprises accessing one or more text values of the one or more user interface elements.

In some embodiments, the computer program instructions, when executed by the at least one processor, further cause the apparatus to serialize the one or more user interface elements further comprises provisioning the one or more user interface elements and generating, using the provisioned one or more user interface elements, web elements that can be rendered in the web browser.

In some embodiments, the computer program instructions, when executed by the at least one processor, further cause the apparatus to record, by the security instrumentation system, an interaction with the one or more user interface elements via the web browser, cause injection of the interaction with the one or more user interface elements into an executing session of the app, receive an indication of an occurrence of an event or behavior that initiates an operation from the app, and relay the event or behavior to an interactivity mediator service, the interactivity mediator service is a rendezvous point for handling one or more sessions associated with the web browser. The one or more sessions associated with the web browser remain active when the web browser is disconnected. In some embodiments, the one or more sessions associated with the web browser provide a real-time display of the interaction with the one or more user interface elements on the app alongside the presentation of the serialized user interface elements via the web browser.

In a third example embodiment, a computer program product comprising at least one non-transitory computer-readable storage medium bearing computer program instructions embodied therein for use with a computer, the computer program instructions comprising program instructions configured to cause the computer to receive, by a security instrumentation system, an app for analysis and discovering, by the security instrumentation system, one or more user interface elements provided by the app. In some embodiments, the computer program instructions, when executed, further cause the apparatus to interrogate, by the security instrumentation system, the one or more user interface elements provided by the app, serialize, by the security instrumentation system, the one or more interface elements, and cause presentation of the serialized one or more interface elements via a web browser.

In some embodiments, the computer program instructions, when executed, further cause the apparatus to discover the one or more user interface elements provided by the app comprises: traversing an object hierarchy of the app to discover a set of potential user interface elements, querying whether each potential user interface element in the set of potential user interface elements supports an event or exhibits a behavior, and enumerating, based on the query, a subset of potential user interface elements that support an event or exhibit a behavior, wherein the subset comprises the one or more user interface elements.

In some embodiments, the computer program instructions, when executed, further cause the apparatus to interrogate the one or more user interface elements provided by the app comprises accessing one or more text values of the one or more user interface elements.

In some embodiments, the computer program instructions, when executed, further cause the apparatus to serialize the one or more user interface elements further comprises provisioning the one or more user interface elements and generating, using the provisioned one or more user interface elements, web elements that can be rendered in the web browser.

In some embodiments, the computer program instructions, when executed, further cause the apparatus to record, by the security instrumentation system, an interaction with the one or more user interface elements via the web browser, cause injection of the interaction with the one or more user interface elements into an executing session of the app, receive an indication of an occurrence of an event or behavior that initiates an operation from the app, and relay the event or behavior to an interactivity mediator service, the interactivity mediator service is a rendezvous point for handling one or more sessions associated with the web browser. The one or more sessions associated with the web browser remain active when the web browser is disconnected.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Figure 1:
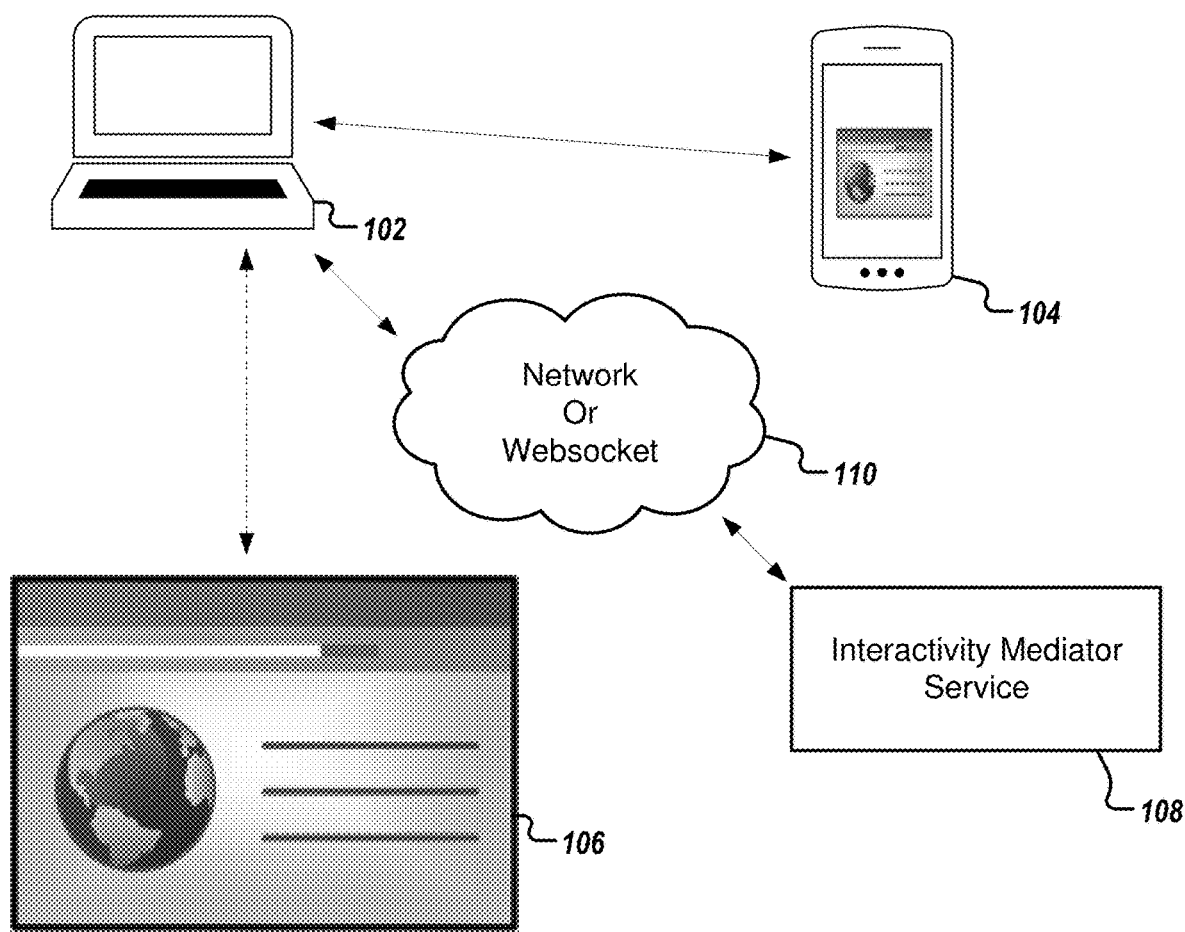
FIG. 1 illustrates a system diagram of various entities that may interact in accordance with some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. The terms "mobile app," "native app," and similar terms may be used interchangeably to refer to an application program that has been developed for use on a particular platform such as for example an Apple iOS device, Android device, or the like. The terms "web app," "web-based app," and similar terms may be used interchangeably to refer to an application program that has been developed for use on web browsers on a personal computer, mobile device, tablet, or the like. Thus, use of any such terms should not be taken to limit the spirit and scope of embodiments of the present invention.

Various parties may have an interest in analyzing and understanding the specific data that is handled, stored, or transmitted by a particular app, in many cases to assess the security of the app against standards, such as encryption of data at rest or in transit. The interested parties can include individual app users, businesses using apps, app developers, government regulators, law enforcement agencies, and others. One reason for this interest is that apps can modify mobile computing devices in unpredictable ways. They can modify system settings, use root access to change the device, or the like. To address this risk, it is typical to use a separate testing system to test a mobile app installed on a mobile computing device. Many existing methods for mobile app security testing may farm out all user interface elements displayed on the screen of the mobile computing device when running the mobile app, and rely upon error prone touch events at X and Y coordinates on a display associated with the traditional testing system. For example, a traditional testing system may determine the location or position (X, Y) coordinate of a particular user interaction element on the display associated with the testing system, and determine an event or behavior type that occurs when that element is 'pressed'. The traditional testing system may then register the determined position (X, Y) coordinate in connection with event or behavior type to an interaction element controller to be used for testing.

However, such implementation of recording (X, Y) coordinate interaction is prone to failure because that particular user interaction element may not always be at that specific coordinate in the native display on the mobile computing device. Thus, a need exists for methods to record direct interaction with the user interface element rather than through recordation of an (X, Y) coordinate on the screen. Example embodiments described herein allow direct interaction with user interface elements, providing a system that is both lightweight, specific, and minimizes potential error. In said example embodiments, the user interacts with a serialized, web version of the mobile app's user interface elements, which provides for a simplified representation consistent with a familiar web browser representation. In some embodiments, a live stream from the native mobile app may be displayed alongside this new serialized web interface to assist with contextual information about what is on the screen of the mobile device.

Accordingly, example embodiments described herein solve at least these problems by providing for direct interaction with user interface elements on a mobile app by providing bridged native and web user interface interaction. To do this, example embodiments utilize a specially configured security instrumentation system, a unique combination of microservices and bridged native and web interaction.

Methods, apparatuses, and computer program products of the present invention may be embodied by any of a variety of devices. FIG. 1 discloses an example interaction diagram 100 to provide some context regarding the environment within which embodiments of the present invention may operate. A user, such a mobile app security analyst, may interact with a security instrumentation system 102 via a network or websocket 110 (e.g., the Internet, or the like) to analyze a native app (application program) on user device 104. The user may interact with a web browser 106 hosted by the security instrumentation system that renders the native UI (user interface) elements from the native app on user device 104. In some embodiments, the environment further comprises an interactive mediator service 108 in communication with the security instrumentation system via the network or websocket 110.

Figure 2:
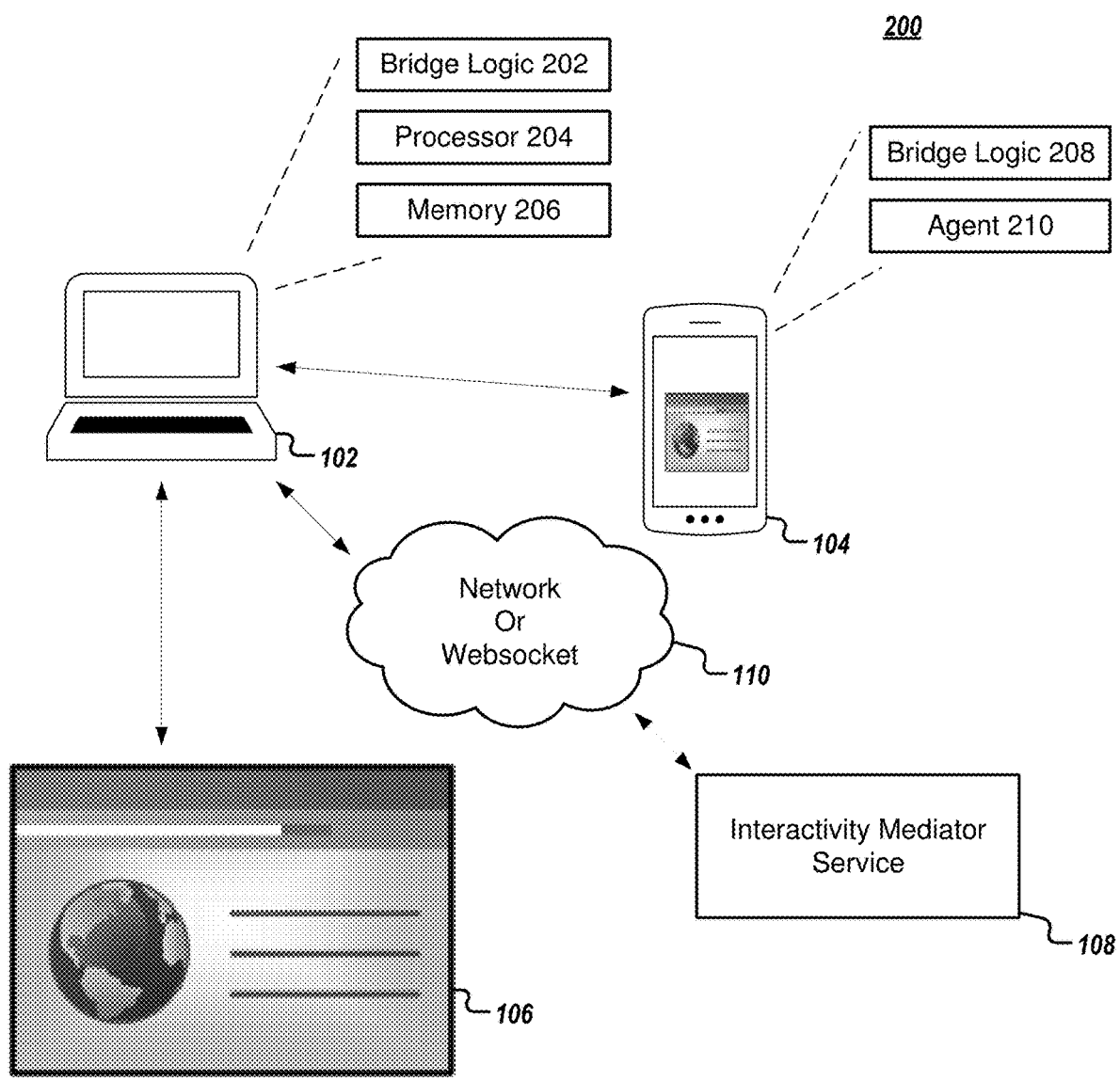
FIG. 2 illustrates the system diagram and additionally illustrates schematic block diagram of example circuitry embodying apparatuses that may perform operations in accordance with example embodiments described herein.

As shown in FIG. 2, the security instrumentation system 102 may comprise bridge logic 202 to instantiate a bridge that serializes the user interface elements of the native app code so they can be rendered on the web browser 106. As the user interacts with the mobile app, the bridge logic 202 is configured to provide these serialized versions to the web browser 106 for the user to interact with. The bridge logic 202 may provide for a link between the web browser 106 and the native app on user device 104 so as to enable commands received in the "bridged" web version to be transmitted in real-time to the user device 104 as commands to the native app being tested. For example, native text boxes in the native app can be represented using HTML (HyperText Markup Language) text input boxes in the web browser 106, select lists or spinners in the native app can be rendered as a dropdown web object in the web browser 106, and so on, and user interactions in the web browser 106 can thus be relayed to the user device 104 to facilitate real-time mobile app interaction.

The security instrumentation system 102 introduces said bridge logic 202 so as to implement a bridging microservice facilitating communication between the web browser 106 and the security instrumentation system 102 (also referred as host computer or rig). In some embodiments, the bridging microservice is in charge of enabling the direct interaction between the user's web browser 106 and a rig session. The rig session acts as a central place for the user's web browser 106 to get the user interface element's updates in real time, and transmit responsive communications. The security instrumentation system 102 forwards the serialized version of the user interface elements for rendering by the web browser 106 and sends via the network or websocket 110 the interactions, which the rig consumes back and runs them thus meeting in the middle on the web socket 110 rather than the user device 104 connecting directly to the rig or the rig directly to the user device 104 to perform said operations.

The security instrumentation system 102 may thus be any computing device known in the art, such as a fixed terminal (e.g., a desktop computer or the like), or a mobile device (e.g., a laptop computer, smartphone, netbook, tablet computer, or the like). As noted above, the user device 104 may be a mobile computing device, such as a laptop computer, smart phone, tablet, netbook, wearable device, or the like (although in some embodiments the user device 104 may itself constitute a fixed terminal), and the user device 104 may execute an app to bridge by the security instrumentation system 102.

As shown in FIG. 2, the security instrumentation system 102 may itself comprise a number of components such as bridge logic 202, processor 204, and memory 206. The security instrumentation system 102 may be configured to execute the operations described below in connection with FIGS. 3 and 4. Although these components 202-206 are described with some functional descriptors, it should be understood that the particular implementations necessarily include the use of particular hardware. The bridge logic 202 may leverage use of the processor 204 and memory 206 to perform its associated functions, and duplicate hardware is not required for the distinct components of the security instrumentation system 102 (although embodiments using duplicated hardware are also contemplated herein). The use of the term "circuitry" as used herein with respect to components of the security instrumentation system 102 therefore includes particular hardware configured to perform the functions associated with the particular circuitry described herein. Of course, while the term "circuitry" should be understood broadly to include hardware, in some embodiments, circuitry may also include software for configuring the hardware components of the security instrumentation system 102.

In some embodiments, the processor 204 (and/or coprocessor or any other processing circuitry assisting or otherwise associated with the processor) may be in communication with the memory 206 via a bus for passing information among components of the security instrumentation system 102. The processor 204 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 204 may be configured to execute instructions stored in the memory 206 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

In some embodiments, the memory 206 may be non-transitory and may include, for example, one or more volatile and/or non-volatile memories. In other words, for example, the memory may be an electronic storage device (e.g., a computer readable storage medium). The memory 206 may be configured to store information, data, content, applications, instructions, or the like, for enabling the apparatus to carry out various functions in accordance with example embodiments contemplated herein.

In addition, the security instrumentation system 102 may also comprise the bridge logic 202, which may utilize processor 204, memory 206, or any other hardware component included in the security instrumentation system 102 to perform the bridging microservice described herein.

The security instrumentation system 102 may utilize the bridging microservice, bridge logic 202 and processing circuitry, such as the processor 204, to facilitate performance of its various operations, and may utilize memory 206 to store computer instructions that, when executed, cause the bridging microservice to perform those operations and store information retrieved in response to performance of those operations.

As described above and as will be appreciated based on this disclosure, example embodiments that may be implemented by the security instrumentation system 102 may comprise various means made up entirely of hardware or any combination of software, microservices, and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated that computer program instructions and/or other type of code may be loaded onto a computer, processor or other programmable security instrumentation system's circuitry to produce a machine, such that the computer, processor other programmable circuitry that execute the code on the security instrumentation system create the means for implementing various functions described herein.

The user device 104 may itself comprise a number of components such as bridge logic 208 and agent 210. The bridge logic 208 may be the same as bridge logic 202, although it is hosted by user device 104 instead of by security instrumentation system 102. In this regard, the bridge logic 208 may be transferred to agent 210. In turn, agent 210 is inserted into a memory space of the native app to facilitate the various functionality described herein. Typically, the memory space of the native app is not accessible unless the user device 104 is "jailbroken." If the user device 104 is jailbroken, however, traditional methods for modifying mobile apps can be used to add the agent 210 to the native app. In some embodiments, however, when the user device 104 is not jailbroken, the security instrumentation system 102 is configured to use an injection tool (such as Frida) to inject the bridge logic 208 into the app's memory space in order to perform the bridging microservice. In yet another embodiment, the security instrumentation system 102 may wrap the app and inject the bridge logic 208.

As described above, the security instrumentation system 102 is configured to wait and receive interaction events from the agent 210 and relay them to the interactivity mediator service 108, which facilitates the bridged interaction, as described herein.

Having described specific components of the security instrumentation system 102 that may be utilized to bridge between the security instrumentation system 102 and the native app of user device 104, example embodiments of the present invention are described below in connection with a series of components used and flowcharts describing operations performed in some example embodiments of the present invention.

Figure 3:
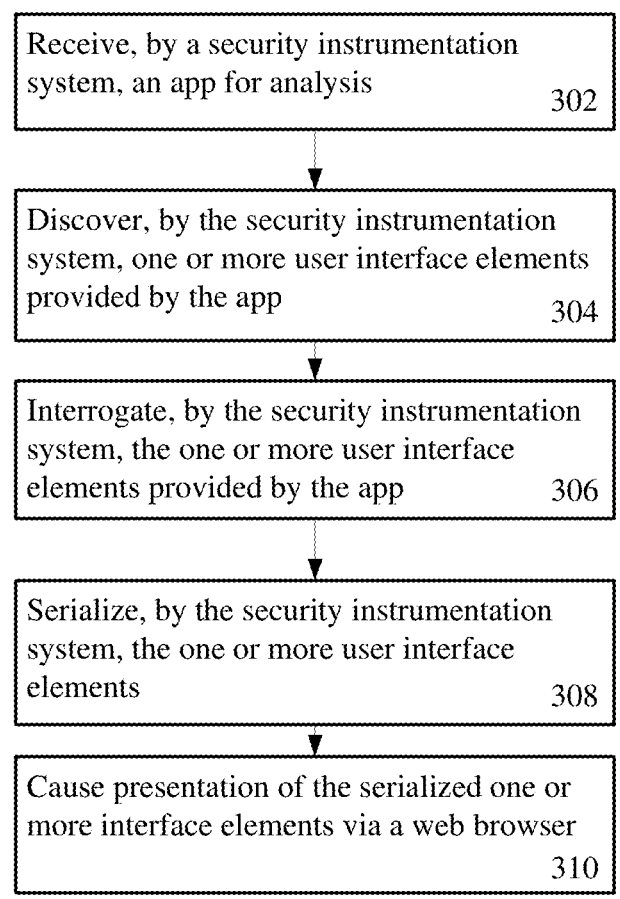
FIG. 3 illustrates a flowchart describing an exemplary process for providing bridged native and web user interface interaction, in accordance with some example embodiments discussed herein.

Turning next to FIG. 3, an example data flow is illustrated for describing an exemplary process for providing bridged native and web user interface interaction, in accordance with some example embodiments discussed herein. The security instrumentation system 102 may be configured to receive an app for analysis (at 302). The security instrumentation system 102 may in turn discover one or more user interface elements provided by the app (at 304). Discovering, by the security instrumentation system, one or more user interface elements provided by the app comprises: traversing an object hierarchy of the app to discover a set of potential user interface elements; querying whether each potential user interface element in the set of potential supports an event or exhibits a behavior; and enumerating, based on the query, a subset of potential user interface elements that support an event or exhibit a behavior. In this regard, the enumerated subset comprises the one or more user interface elements. In some embodiments, the security instrumentation system 102 may be configured to utilize a JavaScript interpreter to capture the one or more user interface elements that have an event or exhibit behavior so as to carry over the captured user interface elements to be serialized and rendered on the web browser. For example, the JavaScript interpreter may capture user interface elements which have clickable events.

The security instrumentation system 102 may also interrogate the one or more user interface elements provided by the app (at 306). In some embodiments, interrogating the one or more user interface elements provided by the app comprises accessing one or more text values of the one or more user interface elements.

Subsequently, the security instrumentation system 102 may serialize, by the security instrumentation system, the one or more user interface elements (at 308). This serialization comprises provisioning the one or more user interface elements using any data serialization format, for example, JavaScript Object Notation (JSON) or Extensible Markup Language (XML) that takes the nested hierarchy of user interface elements to transmit and the actions from the web browser to relay back to the app. For security reasons, the data serialization format needs to be safe to send over the network and the actions returned from the web browser must be minimal in nature. Finally, the security instrumentation system 102 is configured to cause to present the serialized one or more user interface elements via the web browser (at 310). As will be appreciated, implementations enabled by this disclosure have the potential for reducing latency from a user's perspective when interacting with the web browser such that the actions returned from the web browser may be performed and/or rendered immediately in the process asynchronously from the native app.

Figure 4:
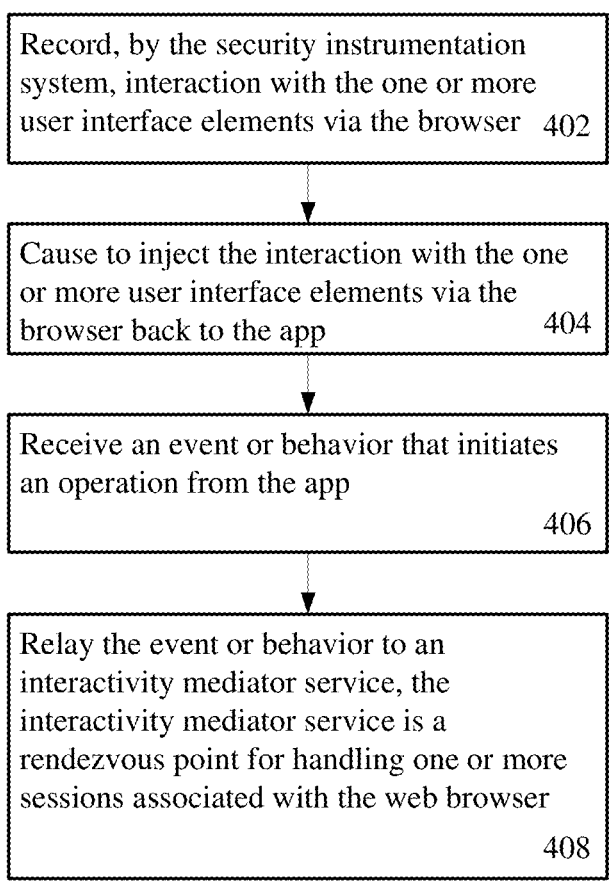
FIG. 4 illustrates a flowchart describing example operations for recording and relaying interaction with one or more user interface elements for use in mobile app security testing, in accordance with some example embodiments described herein.

Turning now to FIG. 4, an example process flow for recording and relaying interaction with one or more user interface elements for use in mobile app security testing, in accordance with some example embodiments described herein. The security instrumentation system 102 may be configured to record the interaction with the one or more user interface elements via the web browser (at 402). In some embodiments where a default user interface automation tool is used based on heuristics for common user interface interactions (e.g., entering username, password, etc.), the user interaction with the serialized representation provides a supplement to an automated tool by requesting and prompting for user interaction on-demand. By adding such human interaction, this may provide a way to make progress in navigating a user interface when the automation scripts are not programmed to sufficiently make decisions automatically. In yet another embodiment, the user's interaction with the serialized representation on the web browser can be recorded which may be saved as a future automation configuration that can be used in the future.

Each record may include the one or more user interface elements of the webpage of the web browser as initially rendered on the display of the security instrumentation system, and may be stored in a memory (e.g., memory 206). This provides for a starting point for subsequent recreation and replaying of a recording session. The record of interaction which may be in the form of the serialization of the one or more user interface elements of the DOM is then injected back into an executing session of the app (at 404) to determine the result of the same interaction on the mobile device, thus providing a real-time display of the interaction with the one or more user interface elements on the app alongside the presentation of the serialized user interface elements via the web browser.

The security instrumentation system 102 may in turn receive an indication of an occurrence of an event or behavior that initiates an operation from the app (at 404). For example, selecting a dropdown box causes an operation of displaying a list of courtesy titles when registering for access to the app. The security instrumentation system 102 may then relay the event or behavior to the interactivity mediator service 108, which acts as a rendezvous point for handling one or more sessions associated with the web browser (at 408). In some embodiments, the JavaScript interpreter is configured to inject the event or behavior into the app to control the app to hook together the interaction with the user interface elements presented by the web browser 106 and those occurring in the user device 104. As such, when a user interacts with the one or more user interface elements rendered on the web browser 106, the same event or behavior applied to the user interface elements shown via the web browser 106 is applied to the corresponding user interface elements on the native app of the user device 104. In some embodiments, the one or more sessions associated with the web browser 106 remains active even when the web 106 browser is disconnected. In another embodiment, if the user disconnects or closes the web browser 106, the session may eventually time out; however, within the timeout window, such embodiments may enable the user to reconnect to the session.

Figure 5:
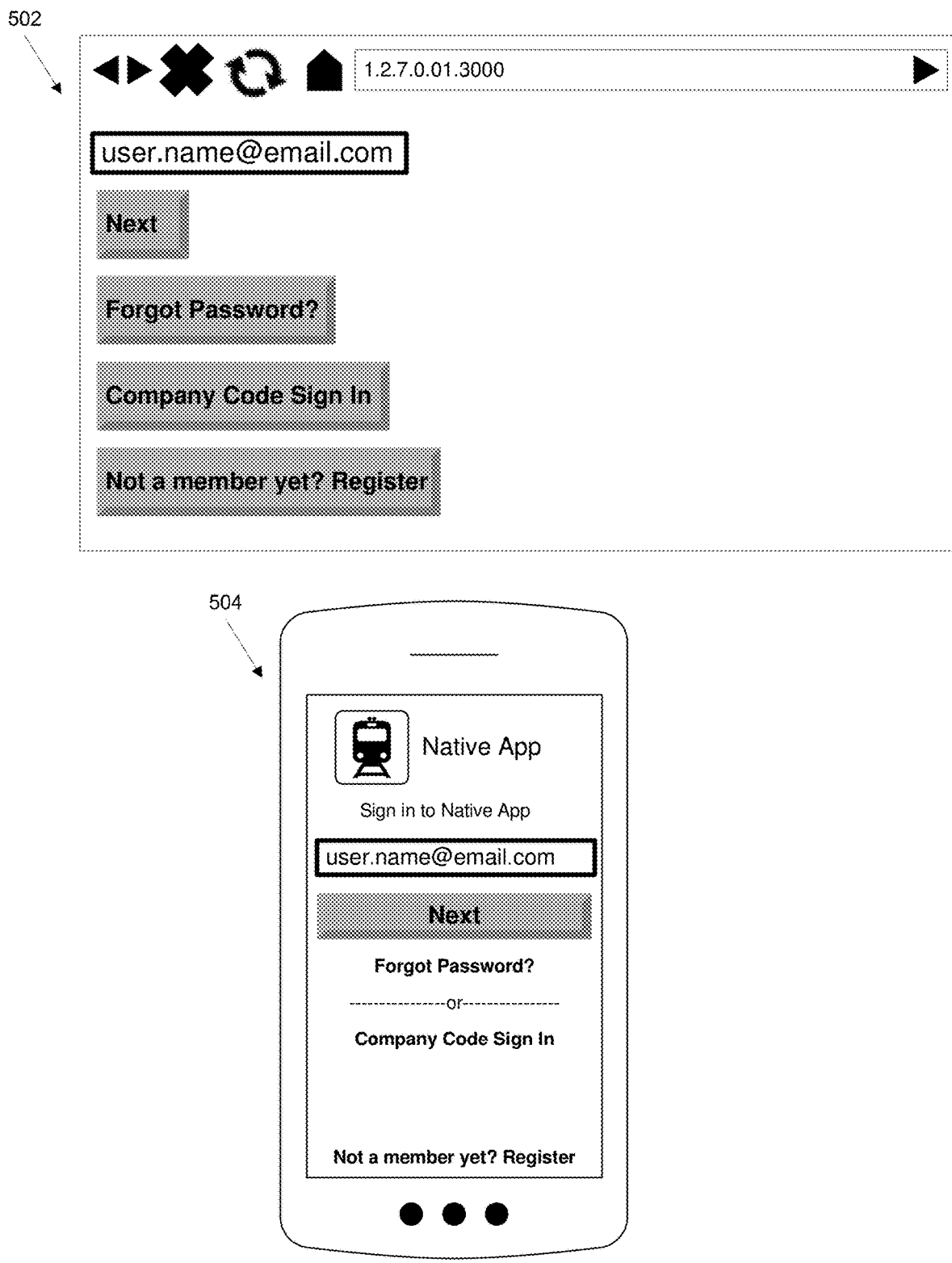
FIG. 5 illustrates schematic representations of user interfaces which may be displayed in accordance with example embodiments discussed herein.

Turning to FIG. 5 example information screens are illustrated that visually represent the real-time display of the interaction with the one or more user interface elements on the native app alongside the presentation of the serialized user interface elements via the web browser 106. As shown at 502 is one example web browser comprising the rendered serialized user interface elements corresponding with the user interface elements found in the native app illustrated at 504. Notably, although the look and feel, and relative arrangement of the user interface elements may differ, selection of the user interface elements in the web browser 106 enable specific identification of the user interface elements, thus enable recording of precise interface interactions despite the changes in resolution, display orientation, or the like caused by this mechanism for porting the display of the mobile app UI to the web browser 106.

In some example embodiments, the security instrumentation system may guide and constrain which user interface elements the user may interact with to achieve desired conditions and increase security testing coverage.

In an example embodiment of the web browser serialized interface is one that is amendable to being used in systems such as the framework provided by Amazon's Mechanical Turk (AMT) interface. AMT provides for a crowd sourcing Internet marketplace where individuals and businesses coordinate the use of human intelligence to perform tasks that computers are currently unable to do. In other words, a human is involved in processes that are difficult for computers to otherwise automate. As described above, certain embodiments of the present invention limit the degree of interaction and responsibilities, whereby a human can assist with solving a UI task so as to achieve further testing coverage of an application. Thus, the bridged UI web interface is designed to take advantage of systems like AMT.

From a security perspective the user interacting via the bridged UI web interface is limited from being able to interact with other parts of the operating system during a testing session. In the case where the user is provided with full interaction with a device e.g., via a Virtual Network Computing (VNC), x-y coordinate based system, or similar systems, there would be the possibility of the untrusted user manipulating settings on the device e.g., changing the device internet protocol (IP) address, login information, or otherwise starting other applications than the target application being tested. The bridged UI web interface allows a restricted interface for the user to provide input, and for the system to always understand what is being requested.

As described above, example embodiments of the present invention facilitate interaction with a familiar web browser representation of a native app's interface in real-time with a recorded session. Example embodiments described herein provide powerful new capabilities in this area. In particular, these embodiments offer an innovative and comprehensive way of testing apps for vulnerabilities and flaws that could compromise app integrity and/or its users' data, or detect malicious or suspicious app. behaviors.

FIGS. 3 and 4 illustrate flowcharts describing the operation of apparatuses, methods, and computer program products according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of the security instrumentation system 102 employing an embodiment of the present invention and executed by a processor of the security instrumentation system 102. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

What is claimed is:

1. A method for improved app security testing using a security instrumentation system, the method comprising:
   receiving, by the security instrumentation system, a native app for analysis;
   discovering, by the security instrumentation system, one or more user interface elements provided by the native app;
   interrogating, by the security instrumentation system, the one or more user interface elements provided by the native app;
   serializing, by the security instrumentation system, the one or more user interface elements of the native app, wherein serializing the one or more user interface elements of the native app comprises provisioning the one or more user interface elements of the native app and generating, using the provisioned one or more user interface elements of the native app, web version interface elements of the native app's one or more user interface elements for rendering in a web browser;
   causing presentation of the serialized web version interface elements of the native app's one or more user interface elements on the web browser;
   recording, by the security instrumentation system, a user interaction with the web version interface elements in the web browser; and
   causing injection of the user interaction with the web version interface elements into the native app.

2. The method of claim 1, wherein discovering the one or more user interface elements provided by the native app comprises:
   traversing an object hierarchy of the native app to discover a set of potential user interface elements;
   querying whether each potential user interface element in the set of potential user interface elements supports an event or exhibits a behavior; and
   enumerating, based on the query, a subset of potential user interface elements that support an event or exhibit a behavior, wherein the subset comprises the one or more user interface elements.

3. The method of claim 1, wherein interrogating the one or more user interface elements provided by the native app comprises accessing one or more text values of the one or more user interface elements.

4. The method of claim 1, further comprising:
   receiving an indication of an occurrence of an event or behavior that initiates an operation from the native app; and
   relaying the event or behavior to an interactivity mediator service, the interactivity mediator service is a rendezvous point for handling one or more sessions associated with the web browser.

5. The method of claim 4, wherein the one or more sessions associated with the web browser remain active when the web browser is disconnected.

6. The method of claim 4, wherein the one or more sessions associated with the web browser provide a real-time display of the interaction with the one or more user interface elements on the native app alongside the presentation of the web version interface elements in the web browser.

7. An apparatus comprising at least one processor and at least one memory including computer program instructions, the at least one memory and the computer program instructions configured to, with the at least one processor, cause the apparatus at least to:
   receive, by a security instrumentation system, a native app for analysis;
   discover, by the security instrumentation system, one or more user interface elements provided by the native app;
   interrogate, by the security instrumentation system, the one or more user interface elements provided by the native app;
   serialize, by the security instrumentation system, the one or more user interface elements of the native app, wherein serializing the one or more user interface elements of the native app comprises provisioning the one or more user interface elements of the native app and generating, using the provisioned one or more user interface elements of the native app, web version interface elements of the native app's one or more user interface elements for rendering in a web browser;
   cause presentation of the serialized web version interface elements of the native app's one or more user interface elements on the web browser;
   record, by the security instrumentation system, a user interaction with the web version interface elements in the web browser; and
   cause injection of the user interaction with the web version interface elements into the native app.

8. The apparatus of claim 7, wherein discovering the one or more user interface elements provided by the native app comprises:
   traversing an object hierarchy of the native app to discover a set of potential user interface elements;
   querying whether each potential user interface element in the set of potential user interface elements supports an event or exhibits a behavior; and
   enumerating, based on the query, a subset of potential user interface elements that support an event or exhibit a behavior, wherein the subset comprises the one or more user interface elements.

9. The apparatus of claim 7, wherein interrogating the one or more user interface elements provided by the native app comprises accessing one or more text values of the one or more user interface elements.

10. The apparatus of claim 7, further comprising the at least one memory and the computer program instructions configured to, with the at least one processor, further cause the apparatus to:
    receive an indication of an occurrence of an event or behavior that initiates an operation from the native app; and
    relay the event or behavior to an interactivity mediator service, the interactivity mediator service is a rendezvous point for handling one or more sessions associated with the web browser.

11. The apparatus of claim 10, wherein the one or more sessions associated with the web browser remain active when the web browser is disconnected.

12. The apparatus of claim 10, wherein the one or more sessions associated with the web browser provide a real-time display of the interaction with the one or more user interface elements on the native app alongside the presentation of the web version interface elements in the web browser.

13. A computer program product comprising at least one non-transitory computer-readable storage medium bearing computer program instructions embodied therein for use with a computer, the computer program instructions comprising program instructions configured to cause the computer to:

receive, by a security instrumentation system, a native app for analysis;

discover, by the security instrumentation system, one or more user interface elements provided by the native app;

interrogate, by the security instrumentation system, the one or more user interface elements provided by the native app;

serialize, by the security instrumentation system, the one or more user interface elements of the native app, wherein serializing the one or more user interface elements of the native app comprises provisioning the one or more user interface elements of the native app and generating, using the provisioned one or more user interface elements of the native app, web version interface elements of the native app's one or more user interface elements for rendering in a web browser;

cause presentation of the serialized web version interface elements of the native app's one or more user interface elements on the web browser;

record, by the security instrumentation system, a user interaction with the web version interface elements in the web browser; and cause injection of the user interaction with the web version interface elements into the native app.

14. The computer program product of claim 13, wherein discovering the one or more user interface elements provided by the native app comprises:

traversing an object hierarchy of the native app to discover a set of potential user interface elements;

querying whether each potential user interface element in the set of potential user interface elements supports an event or exhibits a behavior; and enumerating, based on the query, a subset of potential user interface elements that support an event or exhibit a behavior, wherein the subset comprises the one or more user interface elements.

15. The computer program product of claim 13, wherein interrogating the one or more user interface elements provided by the native app comprises accessing one or more text values of the one or more user interface elements.

16. The computer program product of claim 13, further comprising program instructions configured to cause the computer to:

receive an indication of an occurrence of an event or behavior that initiates an operation from the native app; and relay the event or behavior to an interactivity mediator service, the interactivity mediator service is a rendezvous point for handling one or more sessions associated with the web browser.

17. The computer program product of claim 16, wherein the one or more sessions associated with the web browser remain active when the web browser is disconnected.

\* \* \* \* \*